United States Patent
Cohen (10) Patent No.: US 9,732,527 B2
(45) Date of Patent: Aug. 15, 2017

(54) SKI DEVICE FOR USE WITH A SNOW REMOVAL DEVICE

(71) Applicant: Snow Joe, LLC, Edison, NJ (US)

(72) Inventor: Joseph S Cohen, Edison, NJ (US)

(73) Assignee: SHOW JOE, LLC, Edison, NJ (US)

( * ) Notice: Subject to any disclaimer, the term of this patent is extended or adjusted under 35 U.S.C. 154(b) by 20 days.

(21) Appl. No.: 14/931,558

(22) Filed: Nov. 3, 2015

(65) Prior Publication Data
US 2017/0121979 A1    May 4, 2017

(51) Int. Cl.
*E04D 13/10* (2006.01)
*A01D 7/10* (2006.01)

(52) U.S. Cl.
CPC ............. *E04D 13/106* (2013.01); *A01D 7/10* (2013.01)

(58) Field of Classification Search
CPC .... A01D 7/00; A01D 7/10; E01H 5/02; E01H 5/061; E01H 5/066; E04D 13/106
USPC ........ 37/271, 265, 266, 283–285; 56/400.07, 56/400.13; 294/54.5, 59
See application file for complete search history.

(56) References Cited

U.S. PATENT DOCUMENTS

| 210,650 | A | * | 12/1878 | Weichhart | A01D 7/10 56/400.07 |
| 2,152,377 | A | * | 3/1939 | Friedheim | A01D 7/10 56/400.13 |
| 2,484,409 | A | * | 10/1949 | Jameson | A01B 1/028 294/59 |
| 3,218,738 | A | * | 11/1965 | Bowerman | E04D 13/106 294/54.5 |
| 3,225,394 | A | * | 12/1965 | Tillisch | E04B 9/24 52/204.599 |
| 3,483,643 | A | * | 12/1969 | Wenzel | E01H 5/02 15/236.01 |
| 3,678,670 | A | * | 7/1972 | Welz | A01D 7/00 56/400.14 |
| 4,125,950 | A | * | 11/1978 | Mashford | E01H 5/067 172/188 |
| 4,269,255 | A | * | 5/1981 | Nailor | A62C 2/12 160/1 |
| 4,386,474 | A | * | 6/1983 | Mechavich | E04D 13/106 294/54.5 |
| 4,450,635 | A | * | 5/1984 | Shwayder | E01H 5/061 228/189 |

(Continued)

OTHER PUBLICATIONS

International Search Report, Mailed Feb. 3, 2017, Applicant: Snow Joe, LLC, 10 pages.

*Primary Examiner* — Robert Pezzuto
(74) *Attorney, Agent, or Firm* — Seyfarth Shaw LLP (57) ABSTRACT

A ski device for use in combination with a snow removal device (such as a roof rake). The ski device includes ski portions that may be used to protect a surface (such as a roof surface) from damage by preventing a head of the snow removal device from directly contacting and scraping along the surface from which snow, ice, and/or debris is to be removed. The ski device also allows the amount of clearance between the head of the snow removal device and the surface to be adjusted. This allows a user to position the ski device to provide for a desired amount of clearance, which allows for adjustment of the amount of snow, ice, and/or debris that is to be removed, as well to allow for clearance of other structures (such as rain deflectors, etc.) on the surface.

7 Claims, 8 Drawing Sheets

(56) References Cited

U.S. PATENT DOCUMENTS

| | | | | |
|---|---|---|---|---|
| 4,865,373 | A * | 9/1989 | Hudson | E01H 5/02 |
| | | | | 294/54.5 |
| 4,944,104 | A * | 7/1990 | Kowalczyk | E01H 5/066 |
| | | | | 37/231 |
| 5,240,342 | A * | 8/1993 | Kresa, Jr. | E04B 1/2612 |
| | | | | 248/300 |
| 5,465,510 | A * | 11/1995 | Goodnough | E04D 13/106 |
| | | | | 294/54.5 |
| 5,676,413 | A * | 10/1997 | Hauck | E04D 13/106 |
| | | | | 294/54.5 |
| 7,347,468 | B1 | 3/2008 | Tidcomb | |
| 8,347,528 | B1 | 1/2013 | Seltzer | |
| 8,544,856 | B2 * | 10/2013 | Sayre | E01H 5/066 |
| | | | | 280/28.17 |

* cited by examiner

SKI DEVICE FOR USE WITH A SNOW REMOVAL DEVICE

FIELD

The present disclosure relates to devices for assisting in removing snow and other debris from buildings, houses, structures, and other areas.

BACKGROUND

In general, during the winter months certain geographic areas experience colder temperatures and snowfall. During and after periods of snowfall, houses, buildings, and other areas may be coated or covered with varying amounts of snow and ice. The efficiency and usefulness of current devices to remove such snow and ice can cause damage to roofs and/or be difficult to use based on the amount of snowfall.

SUMMARY

A ski device for use in combination with a snow removal device (such as a roof rake) is disclosed. The ski device includes ski portions that may be used to protect a surface (such as a roof surface) from damage by preventing a head of the snow removal device from directly contacting and scraping along the surface from which snow, ice, and/or debris is to be removed. The ski device also allows the amount of clearance between the head of the snow removal device and the surface to be adjusted. This allows a user to position the ski device to provide for a desired amount of clearance, which allows for adjustment of the amount of snow, ice, and/or debris that is to be removed, as well to allow for clearance of other structures (such as rain deflectors, etc.) on the surface.

In an embodiment, the ski device includes a first ski portion extending in a first direction and a second ski portion extending in a second direction opposite the first direction. An accordion type joint joins the first ski portion and the second ski portion together. The accordion type joint also allows for receipt of a head of a snow removal device and positioning of the first ski portion on a first side of the head and the second ski portion on a second side of the head. The accordion type joint may form a flexible "M" type joint.

An aperture is provided in the accordion type joint for receiving a fastener to couple the ski device to the head. The aperture may be an elongated aperture that allows for a position of the ski device to be adjusted with respect to the head. This allows for adjustment of a height of clearance between the head and a surface when removing snow, ice, or other debris from the surface.

In another embodiment, the ski device includes a first ski portion extending in a first direction and a second ski portion extending in a second direction opposite the first direction. The first ski portion is positionable on a first side of a head of a snow removal device and the second ski portion is positionable on a second side of the head. The first ski portion may include a first base portion and a first tip portion that is angled with respect to a plane of the first base portion. Similarly, the second ski portion may include a second base portion and a second tip portion that is angled with respect to a plane of the second base portion.

An accordion type joint may join the first ski portion and the second ski portion. The accordion type joint allows for receipt of the head and positioning of the first ski portion on the first side of the head and the second ski portion on the second side of the head. An aperture may also be provided in the accordion type joint for receiving a fastener to couple the first ski portion and the second ski portion to the head. As mentioned above, the aperture may be an elongated aperture that allows for a position of the ski device to be adjusted with respect to the head. This allows for adjustment of a height of clearance between the head and a surface when removing snow, ice, or other debris from the surface.

BRIEF DESCRIPTION OF THE DRAWINGS

An embodiment of an extendable device is illustrated in the figures of the accompanying drawings which are meant to be exemplary and not limiting, in which like references are intended to refer to like or corresponding parts, and in which.

DETAILED DESCRIPTION

Detailed embodiments of ski type devices for assisting in removing snow and other debris from buildings, houses, structures, and other areas are disclosed herein, however, it is to be understood that the disclosed embodiments are merely exemplary of the device, which may be embodied in various forms. Therefore, specific functional details disclosed herein are not to be interpreted as limiting, but merely as a basis for the claims and as a representative basis for teaching one skilled in the art to variously employ the present disclosure.

Figure 1:
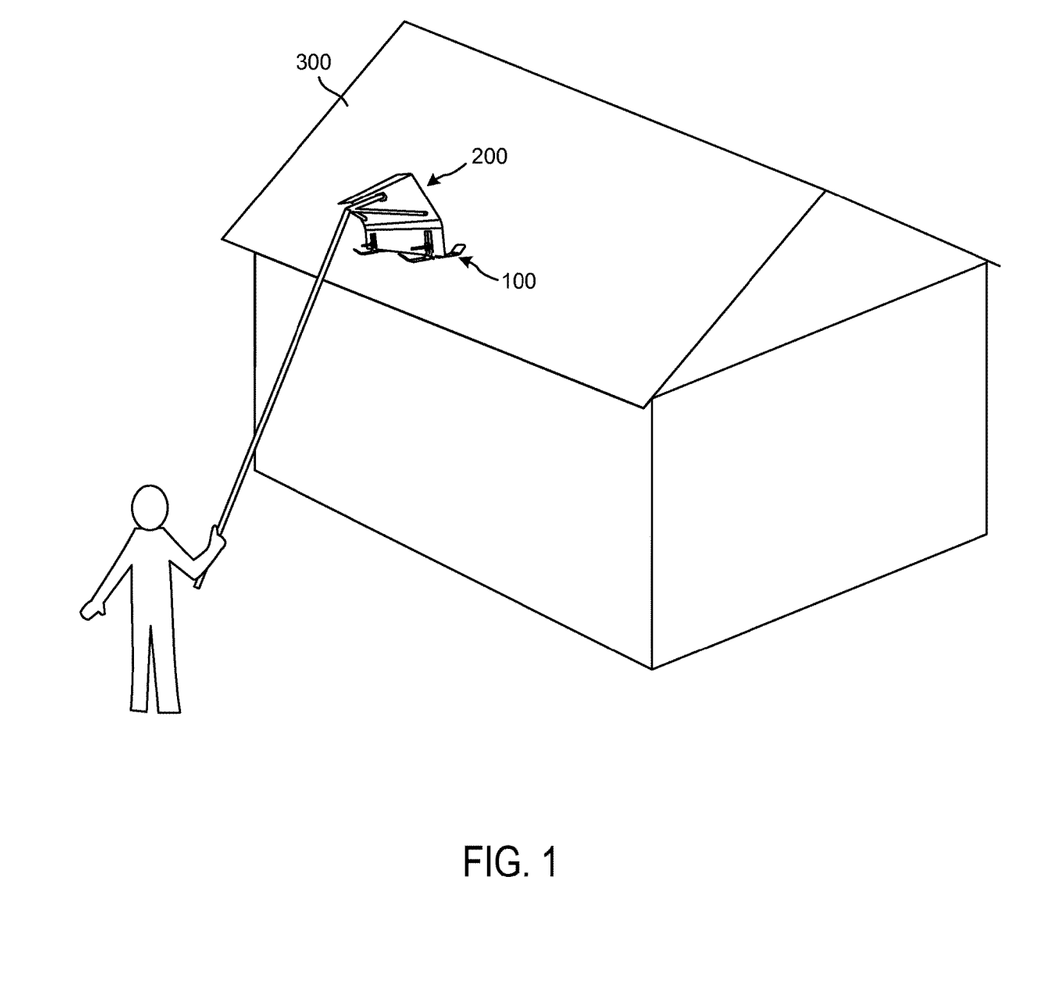
FIG. 1 illustrates a perspective view of a ski device being used in conjunction with a snow removal device according to embodiments of the disclosure.

Referring to FIG. 1, a ski device 100 for use in combination with a snow removal device 200 (such as a roof rake) is disclosed. The ski device 100 includes ski portions that may be used to protect a surface 300 (such as a roof surface) from damage by preventing a head of the snow removal device 200 from directly contacting and scraping along the surface from which snow, ice, and/or debris is to be removed. The ski device 100 also allows the amount of clearance between the head of the snow removal device 200 and the surface 300 to be adjusted. This allows a user to position the ski device 100 to provide for a desired amount of clearance, which allows for adjustment of the amount of snow, ice, and/or debris that is to be removed, as well to allow for clearance of other structures (such as rain deflectors, etc.) on the surface 300.

The ski device 100 for assisting in removing snow and other debris from buildings, houses, structures, and other areas according to an illustrative embodiment is described with reference to FIGS. 2 and 3. As illustrated, the ski device 100 includes a first ski portion 102 extending in a first direction and a second ski portion 104 extending in a second direction opposite the first direction. The first ski portion 102 and the second ski portion 104 are coupled together by an accordion type joint 106 (which in this embodiment forms a flexible "M" type joint).

The first ski portion 102 includes a first base portion 108 that is substantially flat and has a bottom that is configured to glide on snow and ice. The first base portion 108 extends from the accordion type joint 106 in the first direction, away from the accordion type joint 106, and terminates with a first tip potion 110 (also referred to as the first end). As illustrated, the first tip potion 110 is turned upward at a first angle to assist in guiding the first ski portion 102 over snow and ice. For example, the first tip potion 110 may be turned upward at an angle with respect to a plane of the first base portion 108 in a direction toward a top portion of the first ski portion 102.

The second ski portion is similar to the first ski portion 102. For example, the second ski portion 104 includes a second base portion 112 that is substantially flat and has a bottom that is configured to glide on snow and ice. The second base portion 112 extends from the accordion type joint 106 in the second direction, away from the accordion type joint 106, and terminates with a second tip potion 114 (also referred to as the second end). The second tip potion 114 is also turned upward at a second angle (which may be the same as the first angle) to assist in guiding the second ski portion 104 over snow and ice. For example, the second tip potion 114 may be turned upward at an angle with respect to a plane of the second base portion 112 in a direction toward a top portion of the second ski portion 104.

The accordion type joint 106 includes a plurality of portions that form the accordion type joint 106. As illustrated, the accordion type joint 106 includes four portions: a first portion 116, a second portion 118, a third portion 120, and a fourth portion 122 joined together at their respective ends. The first and second portions 116, 118 extend from the respective first and second base portions 108, 112, and are joined together by the third and fourth portions 120, 122. More specifically, the first portion 116 extends, at end 124, from the first base portion 108 of the first ski portion 102 in a direction substantially orthogonal to the plane of the first base portion 108. The end 124 forms a joint between the first portion 116 and the first base portion 108. Similarly, the second portion 118 extends, at end 126, from the second base portion 112 of the second ski portion 104 in a direction substantially orthogonal to the plane of the second base portion 112. The end 126 forms a joint between the second portion 118 and the second base portion 112.

The third portion 120 extends from end 128, which forms a joint between the third portion 120 and the first portion 116, to end 130, which forms a joint between the third portion 120 and the fourth portion 122. Similarly, the fourth portion 122 extends from end 130 to end 132, which forms a joint between the fourth portion 122 and the second portion 118. Thus, the accordion type joint 106 forms a "M" type shape when expanded. Additionally, while the accordion type joint 106 is illustrated and described as having four portions, the accordion type joint 106 may include more than four portions to provide for additional structural strength and stability as desired.

As illustrated, the portions of the ski device 100 described above are formed of a single, monolithic piece of flexible metal to allow the ski device 100 to contour to fit onto a snow removal device (also known as a roof rake) and contour to glide on a roof line of a structure (such as a house). The ski device 100 may be made of metal, plastic, or other suitable material. In one embodiment, the ski device 100 is made of aluminum; however, other types of metal or plastic may be used.

Figure 2:
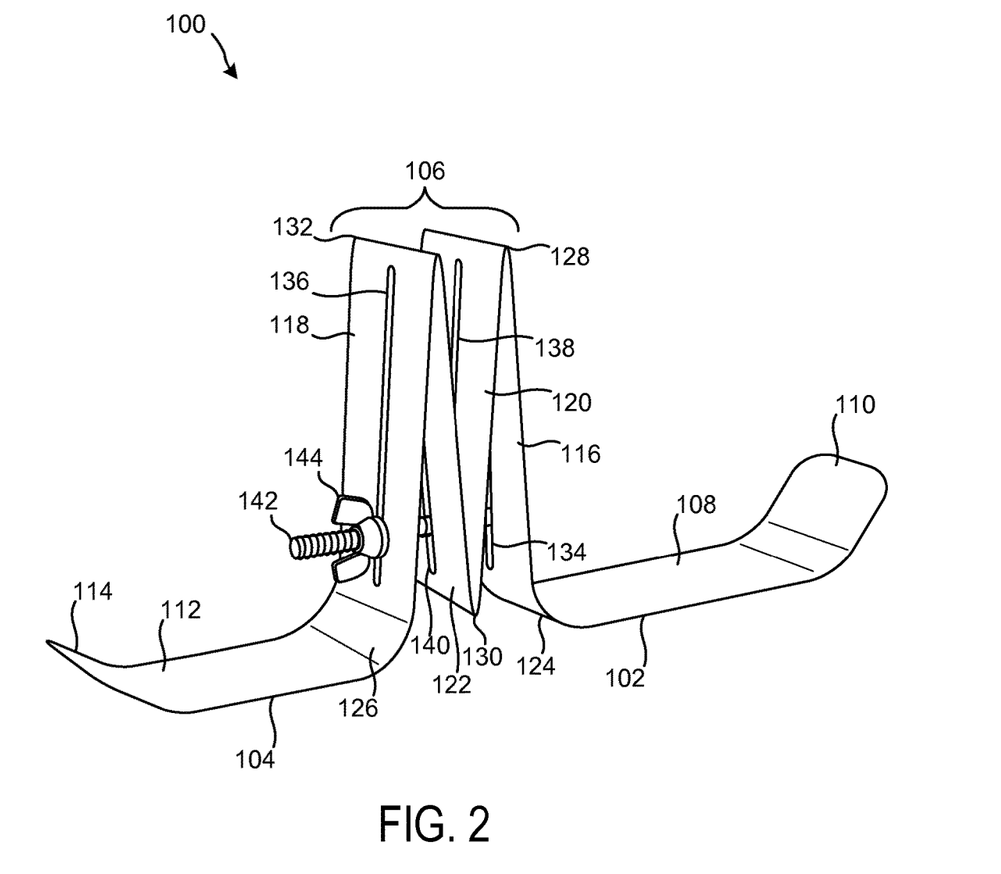
FIG. 2 illustrates a perspective view of a ski device in an open state according to embodiments of the disclosure.
Figure 3:
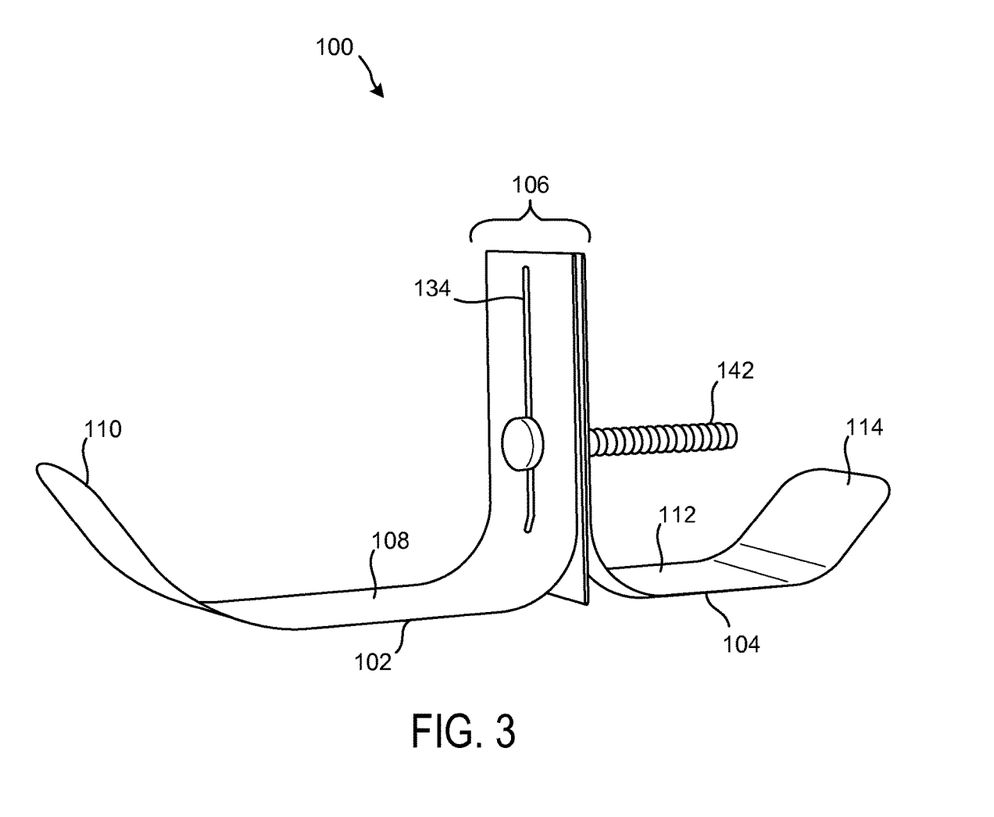
FIG. 3 illustrates a perspective view of a ski device in a closed state according to embodiments of the disclosure.

The first-fourth portions 116-122 of the accordion type joint 106 also include respective first-fourth apertures 134-140, as best illustrated in FIG. 2 illustrating the ski device 100 in an expanded state. The first-fourth apertures 134-140 are positioned to align with one another when the ski device 100 is in a collapsed state, as illustrated in FIG. 3. This allows for a fastener 142 (illustrated as a threaded bolt) to be inserted through all of the first-fourth apertures 134-140. A nut 144 (illustrated as a wing-nut) may be threaded onto the fastener 142 to secure the ski device 100 onto a snow removal device, as described in further detail below. In one embodiment, the first-fourth apertures 134-140 are elongated slots extending lengthwise through the respective first-fourth portions 116-122 of the accordion type joint 106. This allows for the position of the fastener 142 to be adjusted along the length of the first-fourth apertures 134-140. This adjustment allows for the position or height of clearance between an end of a snow removal device and a roof line to be adjusted. However, the apertures 134-140 may be a single circular or other shape hole at a predefined position along the first-fourth portions 116-122 of the accordion type joint 106.

As mentioned above, the ski device 100 is to be coupled to a snow removal device (such as a roof rake) to allow for the snow removal device to glide over a roof line to remove snow, ice, or other debris. A snow removal device 200 that may be used with the ski device 100 to remove snow and other debris from buildings, houses, structures, and other areas according to an illustrative embodiment is described with reference to FIG. 4. The snow removal device 200 includes a handle 202 coupled to a snow removal head 204.

Figure 4:
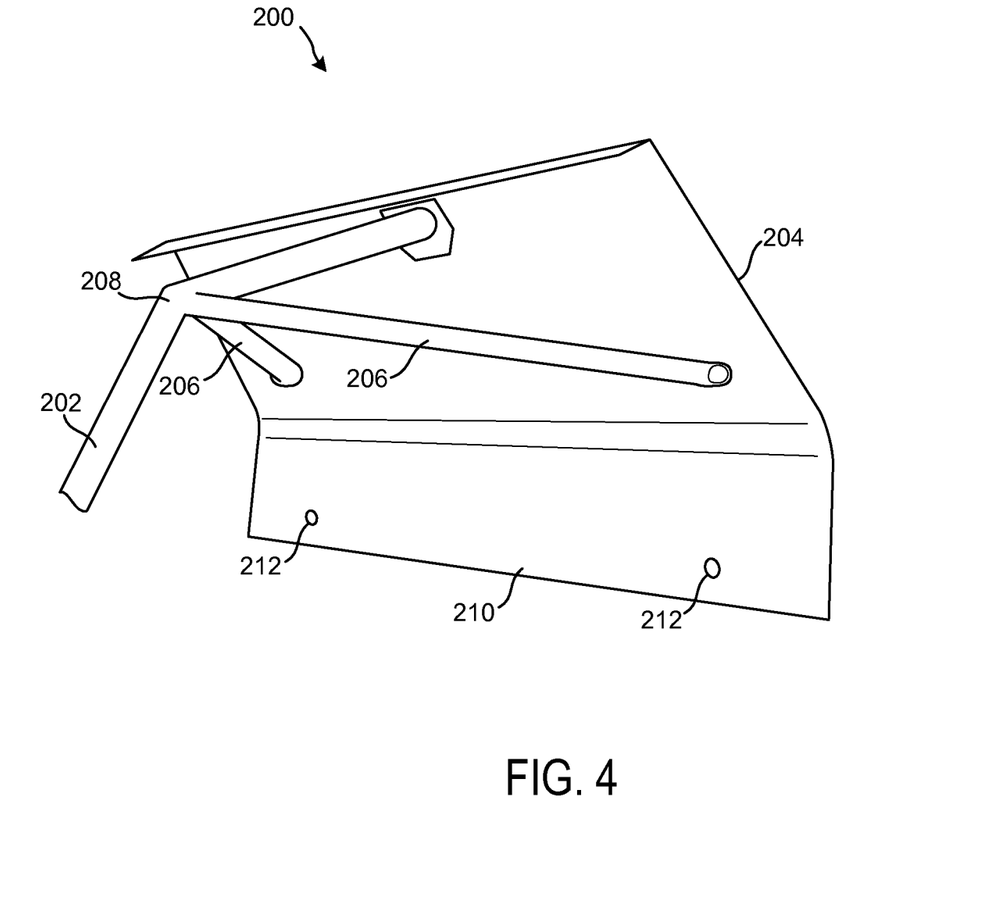
FIG. 4 illustrates a perspective view of a snow removal device for use with the ski device according to embodiments of the disclosure.

The handle 202 may include one or more braces 206 that are also coupled to the snow removal head 204 and the handle 202 to provide additional structural strength and stability to the snow removal device 200. The handle 202 may also include an elbow portion 208 that allows for a user to align the snow removal head 204 with a roof line and/or other surface to remove snow, ice, and/or other debris from the surface.

The snow removal head 204 may include an angled portion 210 that assists in capturing snow, ice, and other debris to allow a user to remove snow, ice, and/or other debris from the roof and/or other surface. As illustrated, the snow removal head 204 includes two apertures 212 proximal to opposing edges of the angled portion 210. These apertures 212 are used to couple respective ski devices 100 to the snow removal head 204, as described in further detail below. It should be appreciated that the apertures 212 may be formed during manufacture of the snow removal device 200 and/or by a purchaser/user of the snow removal device 200 using a drill or other suitable tool.

Figure 5:
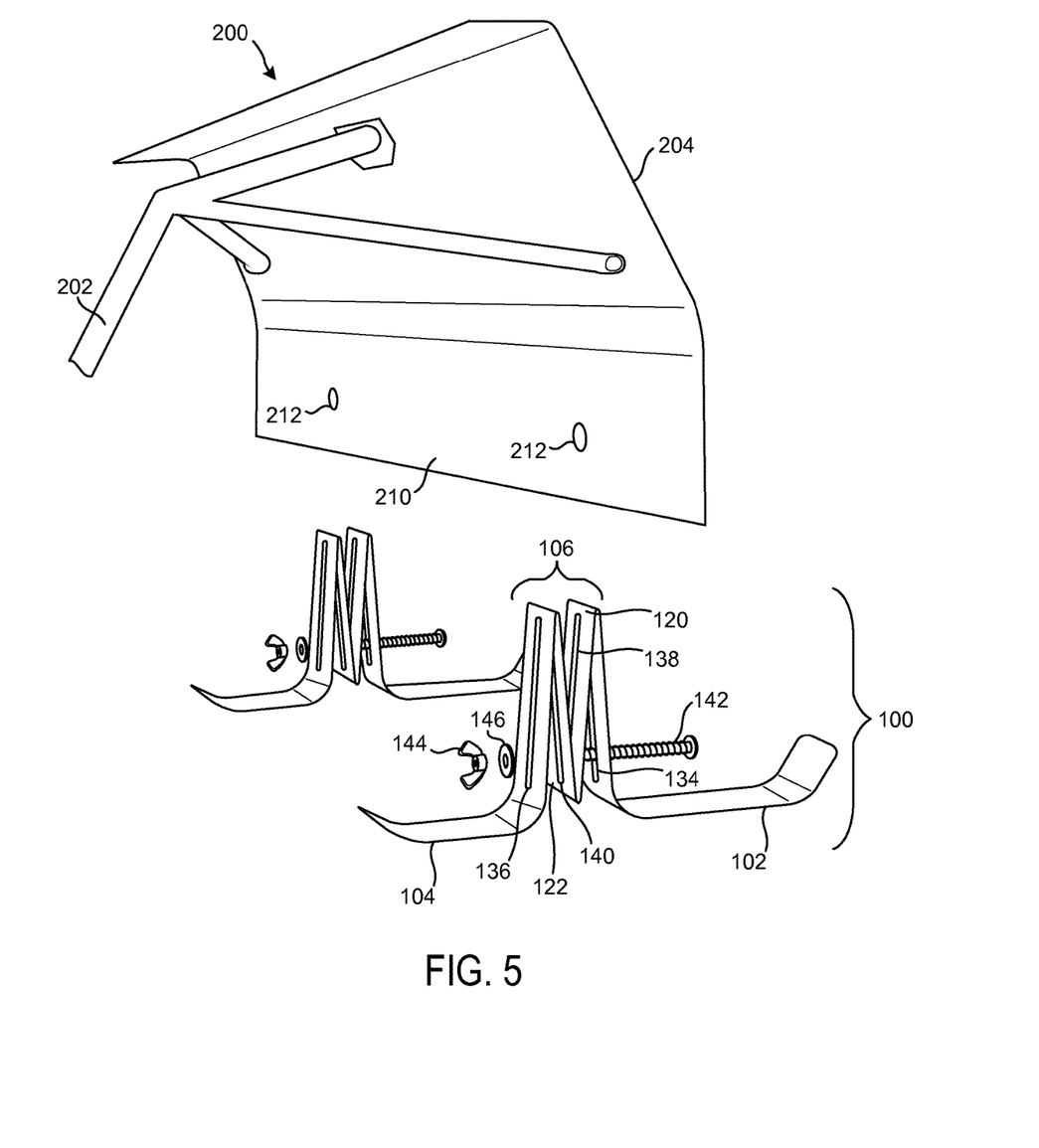
FIGS. 5-7 illustrate perspective views of coupling the ski device to the snow removal device according to embodiments of the disclosure.
Figure 6:
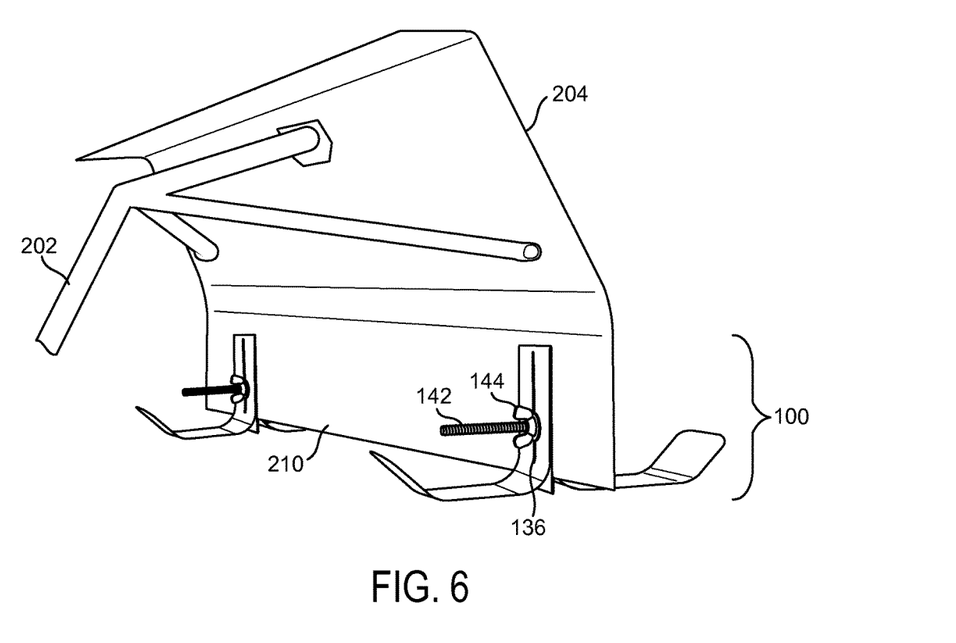
Figure 7:
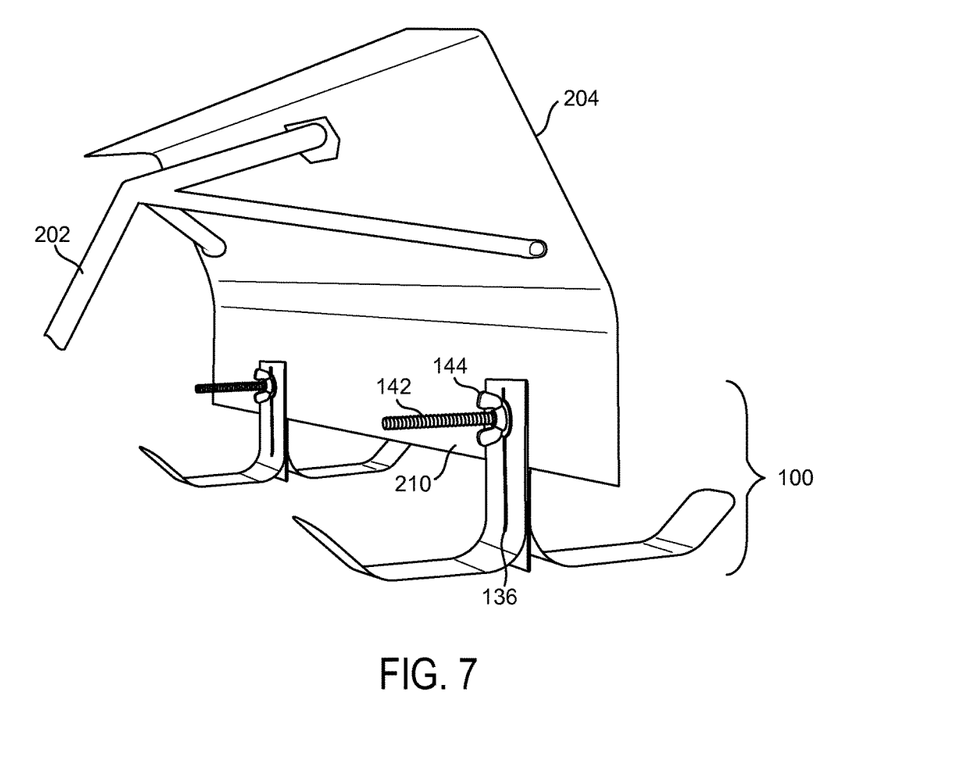

FIGS. 5-7 illustrate installation of a pair of ski devices 100 onto the snow removal device 200. As illustrated, a first and second ski devices 100 may be installed on the snow removal device 200. While installation of one ski device 100 is described below, it should be appreciated that installation of the second ski device 100 may be performed in the same manner.

To install the ski device 100 onto the snow removal device 200, the accordion type joint 106 is expanded to an expanded state. This forms a gap between the third and fourth portions 120, 122 of the accordion type joint 106. The angled portion 210 of the snow removal head 204 is then placed in the gap and the aperture 212 is aligned with the first-fourth apertures 134-140 in the respective first-fourth portions 116-122 of the accordion type joint 106. The accordion type joint 106 is then compressed to place the ski device 100 is a compressed state, and the fastener 142 is placed through the first-fourth portions 116-122 as well as the aperture 212. The nut 144 is threaded onto the fastener 142 thereby coupling the ski device 100 to the snow removal head 204. A washer 146 may also be placed on the fastener 142 between the nut 144 and the accordion type joint 106 if desired.

Figure 8:
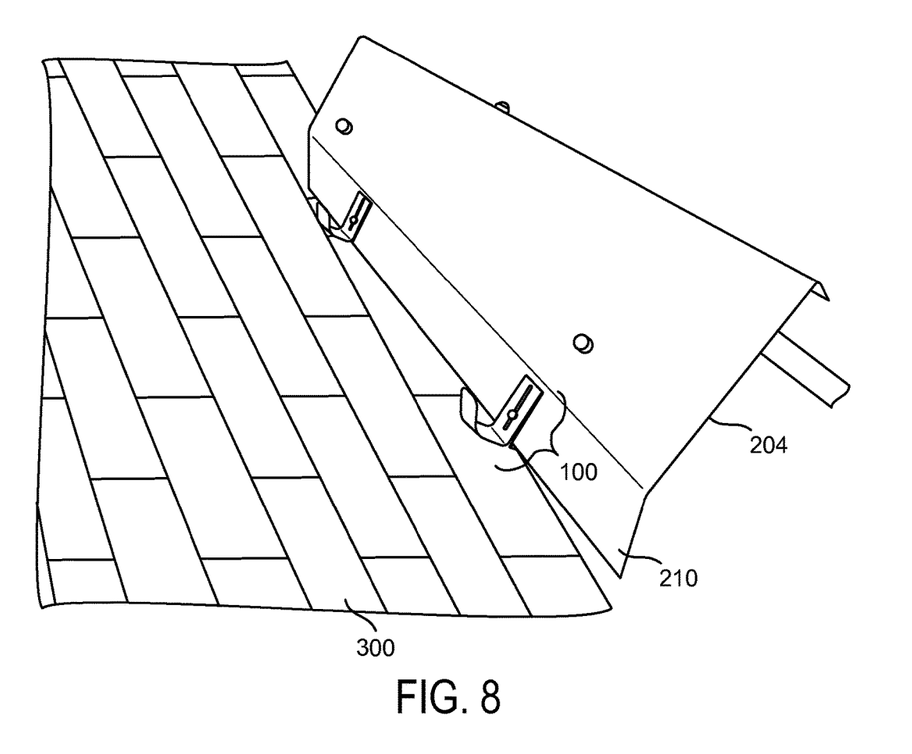
FIGS. 8 and 9 illustrate perspective views of the ski device being used in conjunction with the snow removal device according to embodiments of the disclosure.
Figure 9:
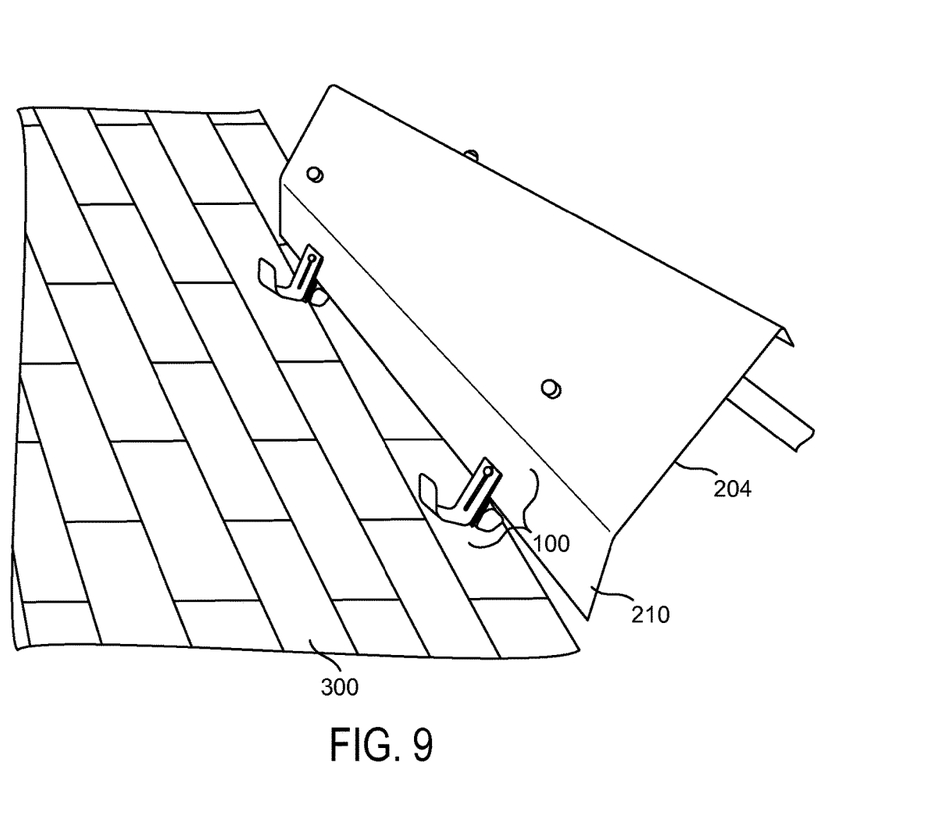

The complete installation of the ski device 100 on the snow removal head 204 is illustrated in FIGS. 6-9. As illustrated in FIGS. 6 and 8, the ski device 100 is installed with the fastener 142 positioned closer to a bottom of the elongated first-fourth apertures 134-140 than to a top of the elongated first-fourth apertures 134-140. This provides for a lower clearance between the snow removal head 204 and a surface 300 (such as a roof) that snow, ice, and/or debris is to be removed from. Referring to FIGS. 7 and 9, to provide for greater clearance, the nut 144 may be loosened and the ski device 100 moved to position the fastener 142 closer to the top of the elongated first-fourth apertures 134-140 than to the bottom of the elongated first-fourth apertures 134-140. This provides for a greater amount of clearance between the snow removal head 204 and the surface 300 (such as a roof).

As illustrated in FIGS. 1, 8 and 9, the surface 300 may be a roof. Further, a user is able to adjust the amount of snow, ice, and/or debris to be removed, as well as the amount of clearance the user desires, for example, to allow for clearance of other structures (such as rain deflectors, etc.) on the roof 300.

The ski device 100 protects the surface (such as roof surface 300) from damage. For example, the ski device 100 prevents the snow removal head 204 from directly contacting and being scraped along the surface from which snow, ice, and/or debris is to be removed. The ski device 100 also allows the snow removal head 204 to glide along the surface of the roof and/or on a layer of snow, ice, or other debris on the surface. This increases the ease of use of the snow removal device 200 by a user.

Although the devices and methods have been described and illustrated in connection with certain embodiments, many variations and modifications will be evident to those skilled in the art and may be made without departing from the spirit and scope of the disclosure. For example, while the ski device 100 is describe as including an accordion type joint that is used to couple the ski device 100 to the snow removal device 200, it should be appreciated that the first ski portion 102 and the second ski portion 104 may be separate pieces. In this respect, the first ski portion 102, along with the first portion 116, and the second ski portion 104, along with the second portion 118, may be placed on opposing sides of the snow removal head 204 and coupled to the snow removal head 204 using the fastener 142 to clamp the snow removal head 204 between the first and second portions 116, 118.

The disclosure is thus not to be limited to the precise details of methodology or construction set forth herein as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:

1. A method of fastening a ski device, comprising:
    contouring the ski device from a single piece of flexible metal to include a first ski portion extending in a first direction;
    contouring the single piece of flexible metal to include a second ski portion extending in a second direction opposite the first direction, the first ski portion positionable on a first side of a head of a snow removal device and the second ski portion positionable on a second side of the head;
    contouring an accordion type joint joining the first ski portion and the second ski portion, the accordion type joint allowing for receipt of the head of the snow removal device and positioning of the first ski portion on the first side of the head and the second ski portion on the second side of the head, the accordion type joint comprising at least four portions for forming a flexible "M" type joint; and
    fastening the ski device to the head of the snow removal device through the accordion type joint.

2. The method of claim 1, further comprising:
    forming an aperture in each of the at least four portions of the accordion type joint for receiving a fastener to couple the ski device to the head, each of the apertures positioned to align with one another when the accordion type joint is in a collapsed state.

3. The method of claim 2, further comprising:
    extending a fastener through each of the apertures when the accordion type joint is in the collapsed state.

4. The method of claim 3, further comprising:
    threading a nut onto the fastener for securing the ski device to the head of the snow removal device when the accordion type joint is in the collapsed state.

5. The method of claim 2, in which the aperture is an elongated aperture that allows for a position of the ski device to be adjusted with respect to the head.

6. The method of claim 1, in which the first ski portion includes a first base portion and a first tip portion that is angled with respect to a plane of the first base portion.

7. The method of claim 1, in which the second ski portion includes a second base portion and a second tip portion that is angled with respect to a plane of the second base portion.

* * * * *